United States Patent
Kim et al.

(10) Patent No.: US 8,015,308 B2
(45) Date of Patent: Sep. 6, 2011

(54) AUDIO/VIDEO TASK CALCULATION METHOD, METHOD OF PROVIDING SUMMARY INFORMATION FOR AUDIO/VIDEO TASK CALCULATION, AND APPARATUS USING THE METHODS

(75) Inventors: Yoon-soo Kim, Suwon-si (KR); Hyung-jae Yoo, Suwon-si (KR); Hyun-sik Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1147 days.

(21) Appl. No.: 11/582,358

(22) Filed: Oct. 18, 2006

(65) Prior Publication Data
US 2007/0094704 A1 Apr. 26, 2007

(30) Foreign Application Priority Data
Oct. 21, 2005 (KR) .................. 10-2005-0099878

(51) Int. Cl.
*G06F 15/16* (2006.01)
*G06F 12/00* (2006.01)

(52) U.S. Cl. ..................... 709/231; 725/143

(58) Field of Classification Search .......... 709/217–219, 709/203, 231–236; 725/143
See application file for complete search history.

(56) References Cited

U.S. PATENT DOCUMENTS

| | | | | |
|---|---|---|---|---|
| 5,519,435 | A * | 5/1996 | Anderson | 725/92 |
| 6,535,639 | B1* | 3/2003 | Uchihachi et al. | 382/225 |
| 7,415,038 | B2* | 8/2008 | Ullmann et al. | 370/468 |
| 7,480,442 | B2* | 1/2009 | Girgensohn et al. | 386/52 |
| 2002/0057895 | A1* | 5/2002 | Oku et al. | 386/46 |
| 2002/0157112 | A1* | 10/2002 | Kuhn | 725/113 |
| 2003/0014758 | A1* | 1/2003 | Kim | 725/87 |
| 2003/0058268 | A1* | 3/2003 | Loui et al. | 345/719 |
| 2004/0243694 | A1 | 12/2004 | Weast | |
| 2004/0267810 | A1 | 12/2004 | Kidd et al. | |
| 2005/0183109 | A1* | 8/2005 | Basson et al. | 725/4 |
| 2005/0235048 | A1* | 10/2005 | Costa-Requena et al. | 709/219 |
| 2006/0165379 | A1* | 7/2006 | Agnihotri et al. | 386/95 |
| 2007/0124679 | A1* | 5/2007 | Jeong et al. | 715/723 |

FOREIGN PATENT DOCUMENTS

| | | |
|---|---|---|
| KR | 10-2003-0058395 A | 7/2003 |
| KR | 10-2005-0006975 A | 1/2005 |
| WO | 2004077207 A2 | 9/2004 |
| WO | 2004107669 A1 | 12/2004 |
| WO | 2005002139 A1 | 1/2005 |
| WO | 2005043408 A1 | 5/2005 |
| WO | 2005079071 A1 | 8/2005 |

\* cited by examiner

*Primary Examiner* — Zarni Maung
(74) *Attorney, Agent, or Firm* — Sughrue Mion, PLLC

(57) ABSTRACT

An audio/visual (AV) task calculation method, a method of providing summary information for an AV task calculation, and an apparatus for the same are provided. The method includes requesting summary information on media data from an AV server storing media data, receiving the summary information from the AV server, and calculating an AV task through the received summary information.

27 Claims, 10 Drawing Sheets

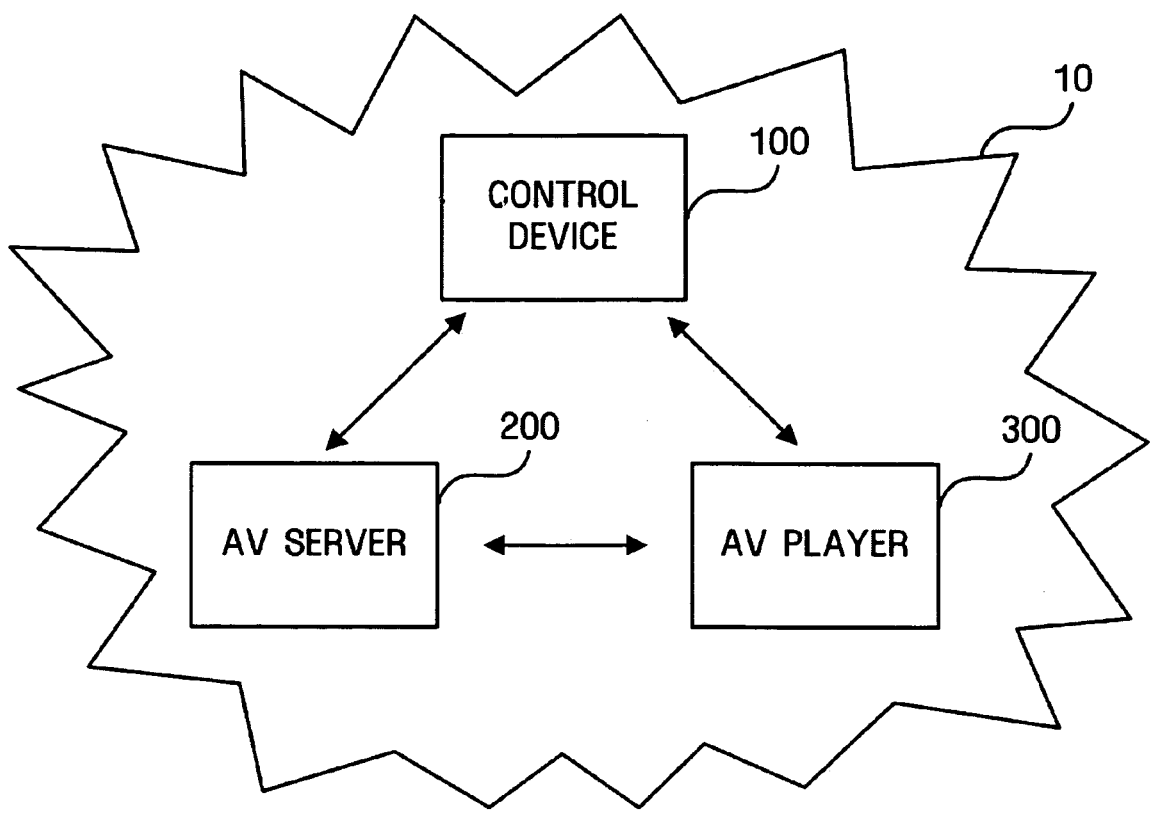

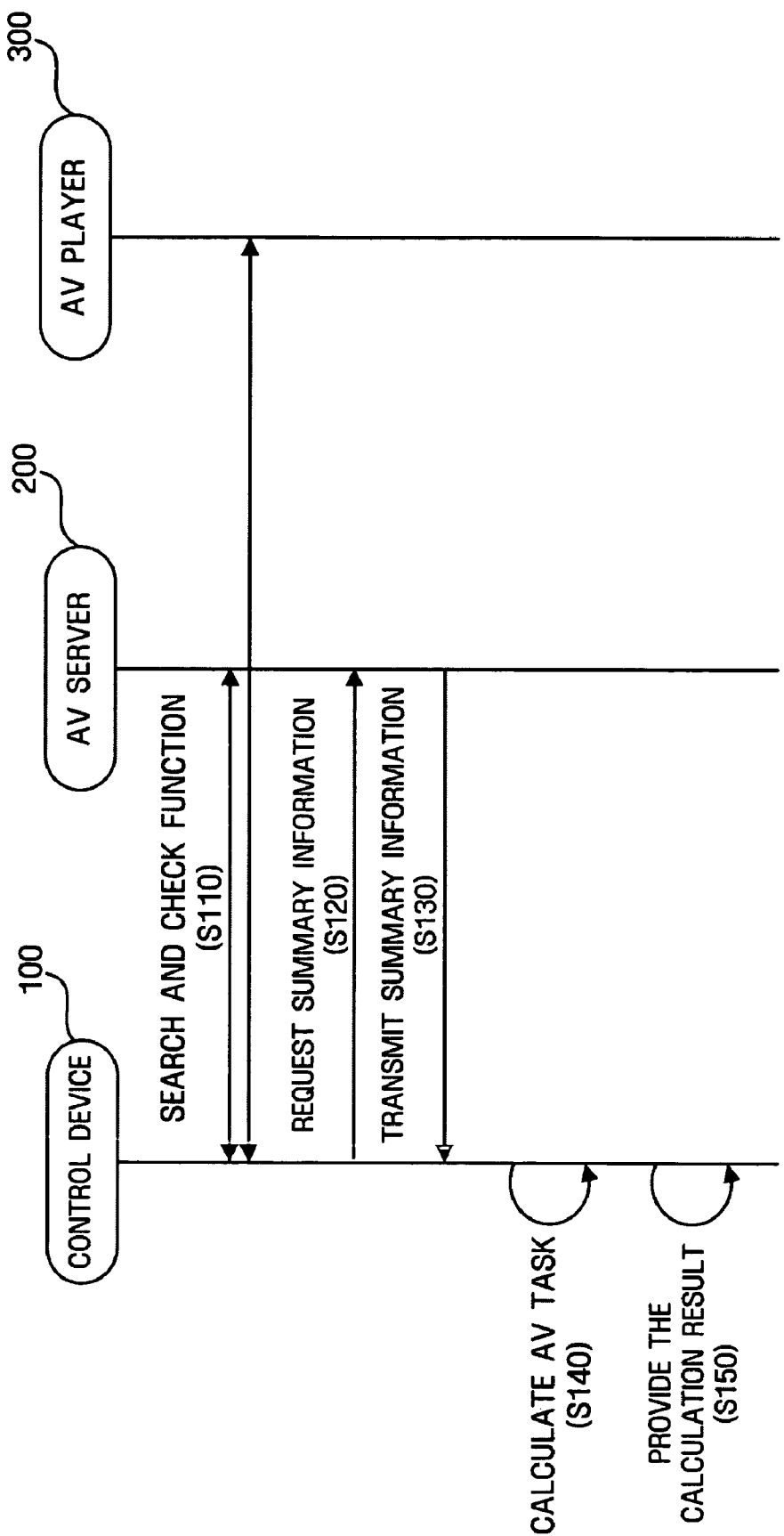

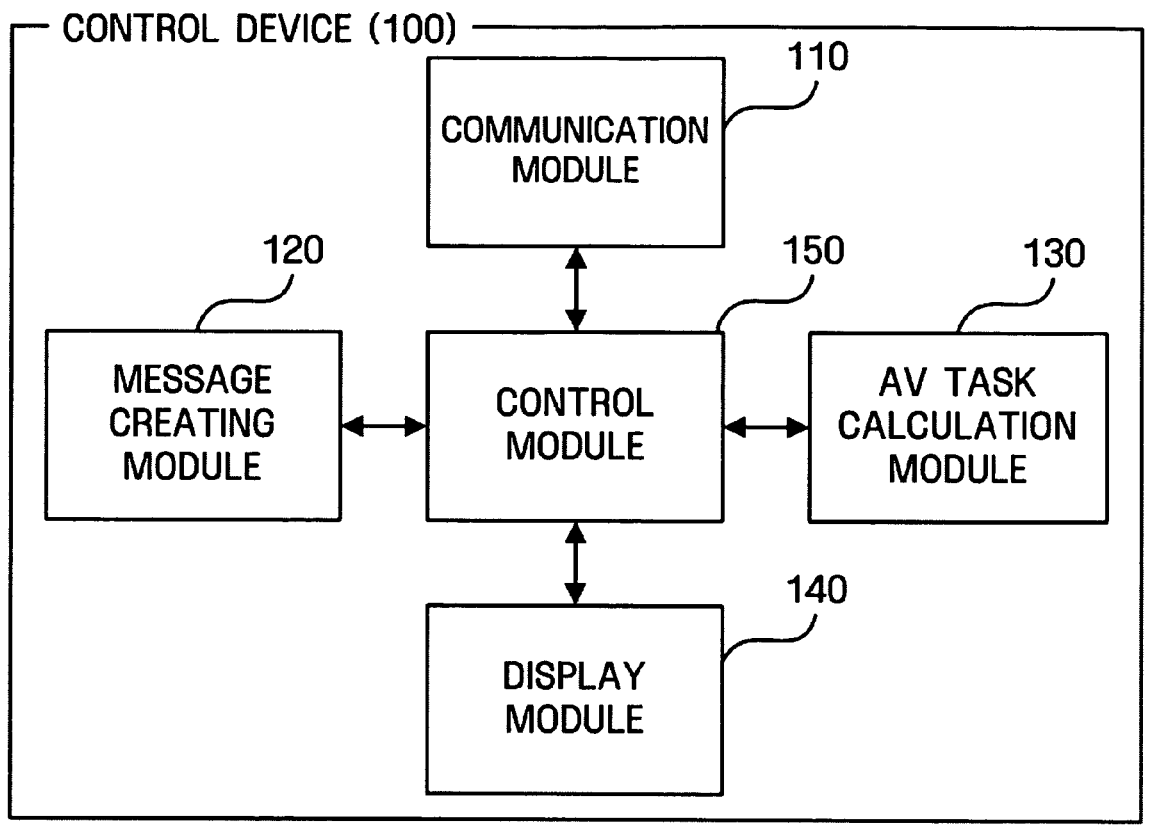

```
<requestSummaryinfo xmlns:qry=" urn:schemas-samsung-com:
getMetadataSummaryInfo ">
410   <qry>video/mpeg2-ps=<xsl:value-of select=" count(contains
         (res/[protocolInfo=video/mpeg2-ps])) "/></qry>
420   <qry>audio/mp3=<xsl:value-of select=" count(contains(res/
         [protocolInfo=audio/mp3])) "/></qry>
430   <qry>image/jpeg=<xsl:value-of select=" count(contains(res/
         [protocolInfo=image/jpeg])) "/></qry>
</requestSummaryinfo>
```

FIG. 4B

```
<requestSummaryinfo xmlns:qry= " urn:schemas-samsung-com:
getMetadataSummaryInfo " >
    <qry>videoItem=<xsl:value-of select= " count(contains(upnp:
        class=video/mpeg2-ps])) " /></qry>
    <qry>audioItem=<xsl:value-of select= " count(contains(upnp:
        class=audio/mp3])) " /></qry>
    <qry>imageItem=<xsl:value-of select= " count(contains(upnp:
        class=image/jpeg])) " /></qry>
</requestSummaryinfo>
```

FIG. 4C

```
Search(
    ContainerID=0,
    SearchCriteria= " upnp:class=object.item.vidoItem or upnp:class derivedfrom
            object.item.vidoItem ",
440 ⁓ ┌─────────────────────────────────────────────────────────┐
    │ Filter= " <requestSummaryinfo><Path Expression for metadata element> │
    │         </requestSummaryinfo> ",                                      │
    └─────────────────────────────────────────────────────────┘
    StartingIndex=0,
    RequestedCount=0
    SortCriteria= " " ,
)
```

FIG. 5A
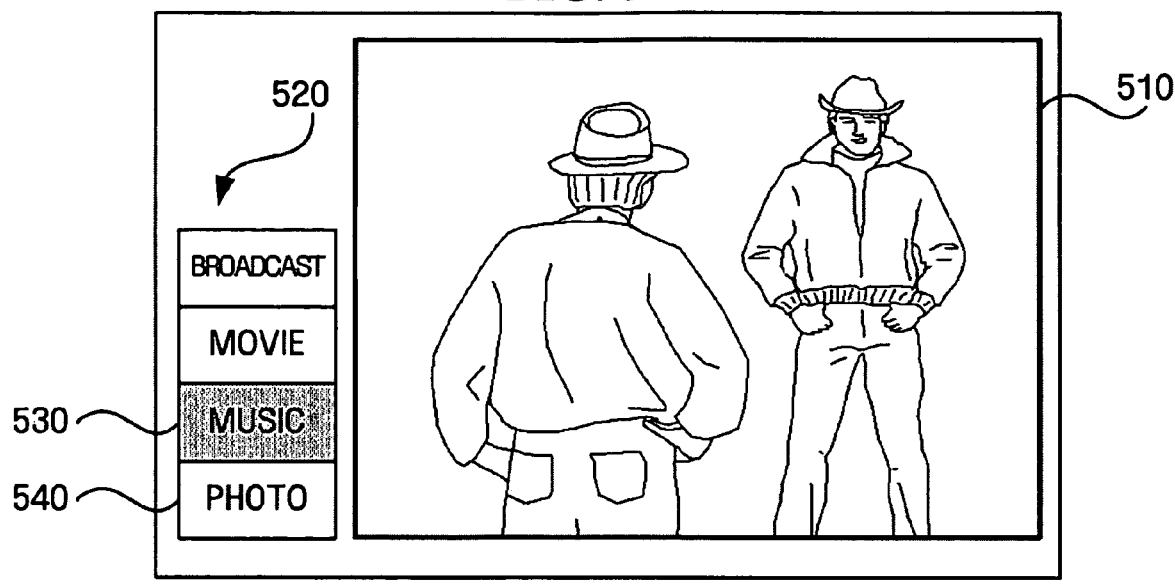
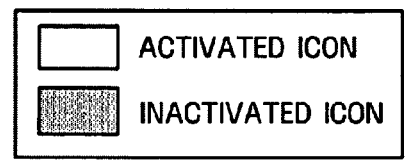

FIG. 7A

```
<metadatasummaryinfo>
  <metadatavalue>video/mpeg2-ps</metadatavalue>        — 610
  <summaryinfo><count>1000</count></summaryinfo>
  <metadatavalue>audio/mp3</metadatavalue>             — 620
  <summaryinfo><count>2000</count></summaryinfo>
  <metadatavalue>image/jpeg</metadatavalue>            — 630
  <summaryinfo><count>3000</count></summaryinfo>
</metadatasummaryinfo>
```

FIG. 7B

```
<metadatasummaryinfo>
  <metadatavalue>videoItem</metadatavalue>
  <summaryinfo><count>1000</count></summaryinfo>
  <metadatavalue>audioItem</metadatavalue>
  <summaryinfo><count>2000</count></summaryinfo>
  <metadatavalue>imageItem</metadatavalue>
  <summaryinfo><count>3000</count></summaryinfo>
</metadatasummaryinfo>
```

AUDIO/VIDEO TASK CALCULATION METHOD, METHOD OF PROVIDING SUMMARY INFORMATION FOR AUDIO/VIDEO TASK CALCULATION, AND APPARATUS USING THE METHODS

CROSS-REFERENCE TO RELATED APPLICATION

This application claims priority from Korean Patent Application No. 10-2005-0099878 filed on Oct. 21, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to an audio/video (AV) task calculation and, more particularly, to an AV task calculation method, a method of providing summary information for an AV task calculation, and an apparatus using the methods.

2. Description of the Related Art

A home network consists of various network devices such as intelligent products, wireless devices and computing devices, which enable a user to control the various network devices as a single connected network. Network devices composing the home network provide services using middleware creating a virtual distributed computing environment. Middleware such as Home Audio Visual Interoperability (HAVi), Universal Plug and Play control device (UPnP), Java intelligent network infra-structure (Jini), and Open Services Gateway initiative (OSGi) have been used to date.

In the home network, a user can receive various AV services such as movies, music, and photo-printing. Technologies for receiving media data between home network devices are disclosed in Korean Unexamined Patent No. 10-2003-0058395: Home Network Device, Home Network Control Device, and Method of Downloading Media data in Home Network, which enable a user to use media at home regardless of location.

A user can search for the type of AV service available in a home network via a control device that controls home network devices; the control device calculates an AV task.

The AV task refers to an operation for determining whether an AV service is available. Media data, a storage device that stores the media data and a player to play the media data are needed in order to use the AV service. The control device searches for the media data and the device needed for the AV service, thereby providing a user with information on the type of AV service provided in a home network.

To calculate the AV task, it has to be determined whether the storage device, the media data, and the player are in the home network as described above. In the related art, when media data stored in a storage device is retrieved, metadata of the media data is cached. If metadata of all media data in the home network is cached, large amounts memory and time are consumed. Since most users have large amounts of media data, this becomes a serious problem.

SUMMARY OF THE INVENTION

An aspect of the present invention provides a method and an apparatus for calculating an AV task through summary information of media data.

Features of the present invention will become clear to those skilled in the art upon review of the following description, attached drawings and appended claims.

According to an aspect of the present invention, there is provided an AV task calculation method, the method including requesting summary information on media data from an AV server storing media data, receiving the summary information from the AV server, and calculating an AV task through the received summary information.

According to another aspect of the present invention, there is provided a method of providing summary information for calculating an AV task, the method including receiving a summary-information-request message from a control device, and transmitting summary information on predetermined media data as a response to the summary information request message.

According to a further aspect of the present invention, there is provided a control device, including a message-creating module that creates a summary-information-request message on media data and sends it to an AV server storing media data, a communication module that transmits the summary-information-request message to the AV server and receives the summary information from the AV server, and an AV-task-calculating module that calculates an AV task through the received summary information.

According to another aspect of the present invention, there is provided an AV server including a communication module that receives a summary information request message from a control device to calculate an AV task, a message-creating module that creates a response message including summary information on predetermined media data as a response to the summary-information-request message, and a control module that transmits the response message to the control device via the communication module.

BRIEF DESCRIPTION OF THE DRAWINGS

The above and other features of the present invention will become apparent by describing in detail exemplary embodiments thereof with reference to the attached drawings in which:

FIG. 1 illustrates an AV system according to an exemplary embodiment of the present invention;

FIG. 2 is a flowchart showing operation of an AV system according to an exemplary embodiment of the present invention;

FIG. 3 is a block diagram of a control device according to an exemplary embodiment of the present invention;

FIG. 4A illustrates a summary information request message according to an exemplary embodiment of the present invention;

FIG. 4B illustrates a summary information request message according to another exemplary embodiment of the present invention;

FIG. 4C illustrates a searching operation of a UPnP AV architecture according to an exemplary embodiment of the present invention;

FIG. 5A illustrates a user interface using an AV-task-calculation result according to an exemplary embodiment of the present invention;

FIG. 7A illustrates summary information according to an exemplary embodiment of the present invention;

FIG. 7B illustrates summary information according to another exemplary embodiment of the present invention;

DETAILED DESCRIPTION OF THE INVENTION

Figure 5B:
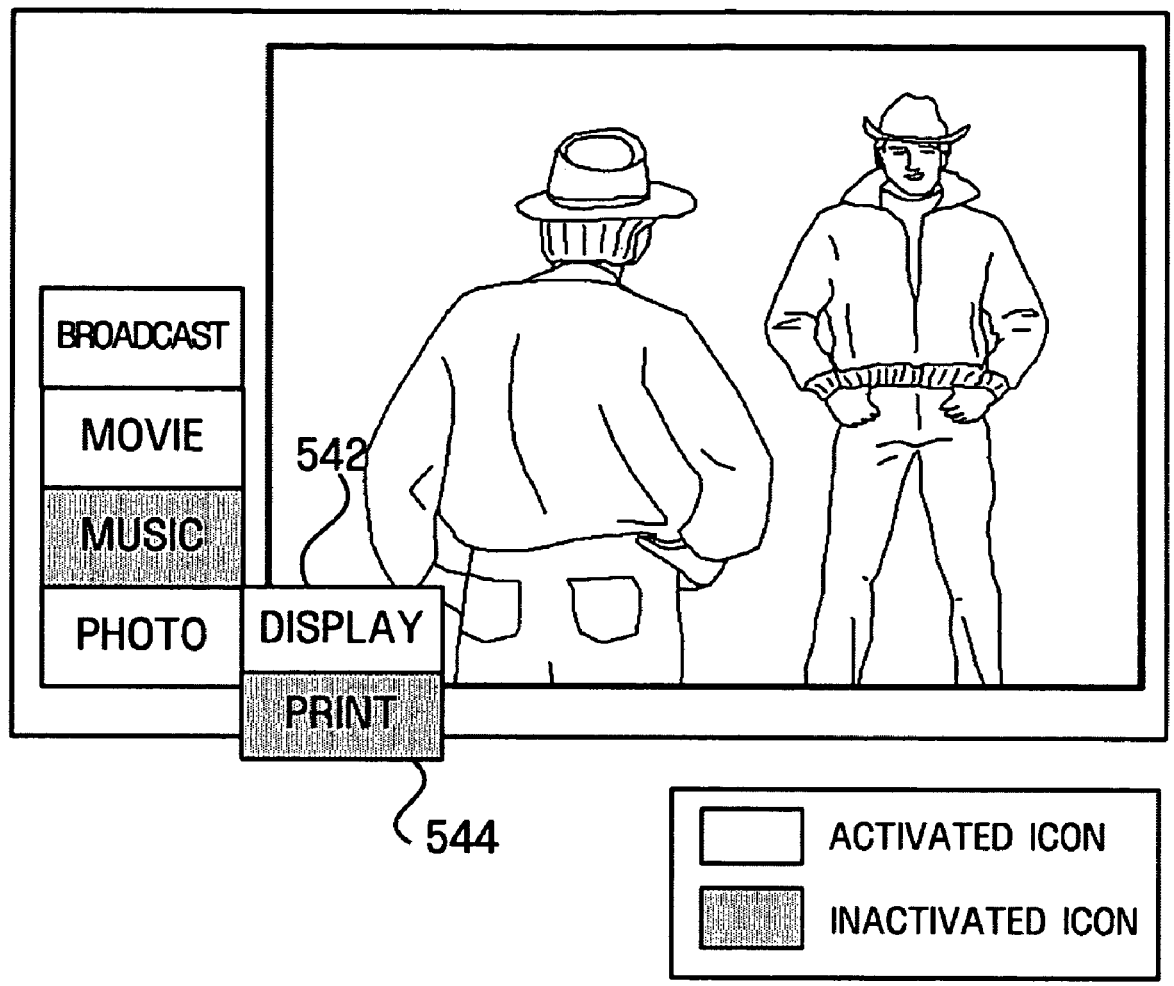
FIG. 5B illustrates a user interface using an AV task calculation result according to another exemplary embodiment of the present invention.

Exemplary embodiments of the present invention will be described in detail with reference to the accompanying drawings.

Aspects of the present invention may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Before the detailed description is set forth, terms used in this specification will be described briefly. Description of terms is provided for a better understanding of the specification, and terms that are not explicitly defined herein are not intended to limit the breadth of the invention.

Media Data

Media data includes videos (i.e., moving pictures), audio, images (i.e., still pictures), and text. Media data can be in various formats such as movies, music, photos, and games.

AV Service

An AV service enables a user to use media data by playing back predetermined media data. Here, "play back" refers to "playing", "displaying", "executing", "copying", "recording", and "printing". Examples of such AV services are playing movies and music, printing images, displaying images, executing games, recording broadcast and sounds, and copying photos and music.

AV Server

An AV server includes a storage medium such as a flash memory, and therefore it can store media data, and then provide the stored media data to the other device. Examples of such AV server are a personal video recorder (PVR) and a personal computer (PC).

AV Player

An AV player can receive media data from the AV server, and play the media data. Examples of such AV player are a digital TV, a portable multimedia player, and an audio system.

Control Device

A control device can control the AV server and the AV player. The control device obtains summary information on media data from the AV server, and calculates an AV task through the obtained information. If UPnP is used as middleware to embody a home network, the AV server and the AV player may be a controlled device. Also, the control device may be a UPnP control point.

AV Task

The AV task shows whether an AV service to be provided to a user via devices in a home network exists. In order to provide a movie playing service, an AV server storing a movie file, and an AV player able to play the movie file must be present in the home network. In this case, the AV task for playing movies is in the home network. Accordingly, the phrase "calculating an AV task" in this specification means "determining whether an AV service is able to be provided to a user via devices in a home network".

FIG. 1 illustrates an AV system according to an exemplary embodiment of the present invention.

An AV system 10 includes a control device 100, an AV server 200, and an AV player 300. The control device 100, the AV server 200, and the AV player 300 have been illustrated as separate devices in the description of terms and figures; however, two or more devices may be integrated into a single device. Also, one or more control devices 100, AV servers 200, and AV players 300 may exist in the single AV system 10. The AV system 10 can be embodied as a home network.

Operation of the AV system 10 will be described with reference to FIG. 2. The control device 100 searches for the AV server 200 and the AV player 300 in the AV system, and checks their functions S10.

The control device 100 checks whether the AV server 200 and the AV player 300 exist and their function S110. In detail, the control device 100 understands function for storing media in the AV server 200 and the function for playing media stored in the AV player 300. Examples of the function for playing media data are playing moving picture files and music files, displaying image files, printing image files, and executing games.

If the AV system 10 is embodied through UPnP, S110 may be embodied through UPnP discovery and UPnP description.

In UPnP discovery, the control device 100 multicasts a search message in order to check whether the AV server 200 and the AV player are in the AV system 10. The AV server 200 and the AV player 300 that receive the search message unicast a response message to the control device 100. The control device 100 may use the Simple Service Discovery Protocol (SSDP), which is a search protocol. The AV server 200 and the AV player 300 are controlled by the control device 100 through the response message.

In the UPnP description, the control device 100 can understand functions of the AV server 200 and the AV player 300. The control device 100 requests a device description file and a service description file from the AV server 200 and the AV player 300. The AV server 200 and the AV player 300 transmit the device description file and the service description file upon the control device's 100 request.

The device description file and the service description file are in a markup language such as XML, and include detailed information on the AV server 200 and the AV player 300. Accordingly, the control device 100 may obtain detailed information on the AV server 200 and the AV player 300 through the device description file and the service description file.

The UPnP discovery and the UPnP description is an embodiment of S110, and therefore, the present invention is not limited thereto. S110 may also be embodied through other protocols.

When the AV server 200 is retrieved S110, the control device 100 requests summary information on media data from the AV server 200 S120.

The AV server 200 transmits summary information on media data stored in the AV server 200 to the control device 100 S130. Here, the summary information details whether the AV server 200 stores media data and the file format of the media data.

When receiving the summary information from the AV server 200, the control device 100 calculates an AV task through the summary information S140. The control device 100 can determine what type of AV service can be provided from the AV system 10.

When the AV task is calculated, the control device 100 provides the calculation result to the application requiring the result S150. Here, the application may included in the control device 100 or the other device within the AV system 10.

The control device 100 and the AV server 200 will be described in detail with reference to FIGS. 3 to 7B in the following.

FIG. 3 is a block diagram of a control device according to an exemplary embodiment of the present invention.

The illustrated control device 100 includes a communication module 110, a message-creating module 120, an AV-task-calculating module 130, a display module 140, and a control module 150.

The communication module 110 communicates with the AV server 200 and the AV player 300 via a wired or wireless medium.

The message-creating module 120 creates messages to be transmitted to the AV server 200 and the AV player 300. For example, the message creating module 120 can create the message needed in the UPnP discovery and description illustrated in FIG. 2.

Also, the message creating module 120 creates a summary-information-request message according to an exemplary embodiment of the present invention. The summary-information-request message includes types (e.g., video, audio, image, and text) and file formats (e.g., video formats such as MPEG-2, MPEG-4, and AVI and audio formats such as MP3, ogg, and midi).

The summary-information-request message can be used when the AV server 200 requests summary information on the media data stored in the AV server 200. The summary information is needed to calculate an AV task, and may include the number of media data stored in the AV server 200. More particularly, the summary information may include the number of media data stored in the AV server 200 by type and file format.

FIG. 4A illustrates a summary-information-request message created by the message-creating module 120. FIG. 4A shows the multipurpose Internet mail extensions (MIME) type of summary information request message. The summary-information-request message illustrated in FIG. 4 requests summary information on video, audio, and image data. More particularly, the summary-information-request message requests summary information on the number of media data that has the MPEG2-PS format, the MP3 format, and the JPEG format via a first line 410, a second line 420, and a third line 430.

FIG. 4B illustrates an object type of a summary information request message according to another exemplary embodiment of the present invention. The summary information request message illustrated in FIG. 4B is the same as the illustrated in FIG. 4A. The summary-information-request message illustrated in FIG. 4B may be used in the UPnP environment. More particularly, the summary-information-request message may be used in order to calculate the AV task by being included in search operation or browse operation needed to search for media data in UPnP AV architecture (not limited to its version). As illustrated in FIG. 4C, the message-creating module 120 enables the message illustrated in FIG. 4B to be included in a filter line 440 of search operation as a string format.

The AV-task-calculating module 130 calculates the AV task through a function of the AV player 300 retrieved in the AV system 10 and summary information received from the AV server 200 retrieved in the AV system 10. That is, the AV task calculating module 130 can determine what type of AV service in the AV system 10 can be provided to a user through a combination of the type and the file format of media data stored in the AV server 200 retrieved in the AV system 10, and the function of the AV player 300 retrieved in the AV system 10. If the AV server 200 stores movie files and the AV player 200 is a moving picture player such as a portable media player (PMP), a movie-playing service can be provided in the AV system 10. If the AV server 200 stores music files and the AV player 300 is an audio system, a music-playing service can be provided in the AV system 10.

The display module 140 displays an available AV service of the AV system 10 to a user through the result of calculating the AV task by the AV task-calculation module 130. For example, the display module 140 can guide a user to use the AV service by displaying the user interface (UI) illustrated in FIG. 5A. In FIG. 5A, the first display area 510 displays a playing state of media data being used by a user and the second display area 520 displays a category of the available AV service in the AV system 10 as icons. A shadow music icon 530 in FIG. 5A refers to an inactive icon, which means that music services are not available in the AV system 10. That is, in the calculation result of the AV task calculating module 130, the icon refers to a case when music files are not found in media data of the AV system 10, or a case where an AV player (e.g., an audio system) able to play the music files is not in the AV system 10 even though music files are found in the AV system 10.

FIG. 5B depicts a user interface that can be provided when a user selects a photo icon 540 in the user interface illustrated in FIG. 5A. In FIG. 5B, a display icon 542 is activated, but a print icon 544 is inactivated; which means that image files and an AV player (e.g., a TV or a computer monitor) that can play the image files are in the AV system 10 and an AV player (e.g., a printer) that can print the image files is not in the AV system 10.

The control module 150 controls modules 110 to 140 that compose the control device 100. Also, the control module 150 can transmit the AV task calculation result calculated by the AV task calculating module 130 to other devices via the communication module 110.

Figure 6:
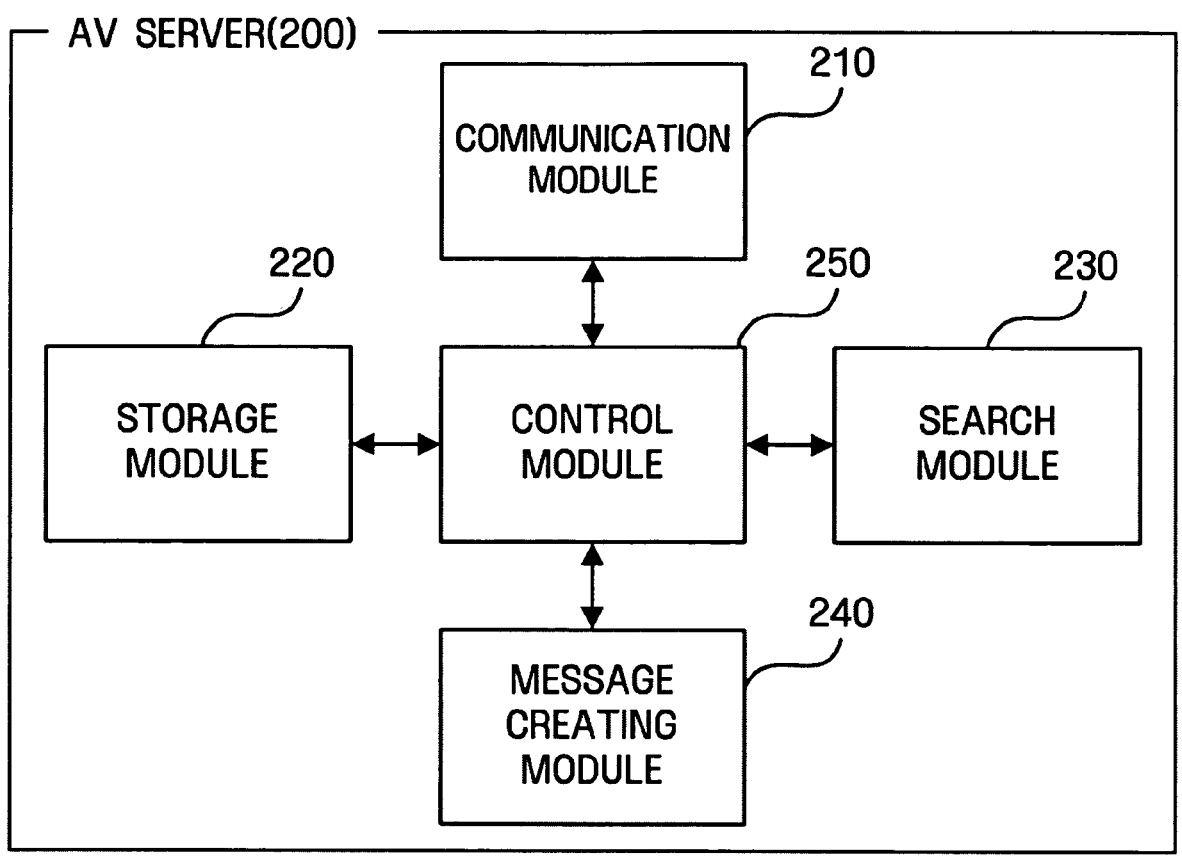
FIG. 6 is a block diagram of an AV server according to an exemplary embodiment of the present invention.

FIG. 6 is a block diagram of an AV server 200 according to an exemplary embodiment of the present invention.

The illustrated AV server 200 includes a communication module 210, a storage module 220, a search module 230, a message-creating module 240, and a control module 250.

The communication 210 communicates with the control device 100 via a wired or wireless medium.

The storage module 220 stores predetermined media data. For example, the storage module 220 can store a moving image, image, music data. Accordingly, the storage module 220 may be hard disk or flash memory.

When a summary-information-request message is received from the control device 100, the search module 230 searches for media data identified through the summary-information-request message of media data stored in the storage module 220.

If the summary-information-request message illustrated in FIG. 4A is received, the search module 230 searches for MPEG2-PS video data, MP3 audio data, and JPEG image data.

If the summary-information-request message is not received from the control device 100, the search module 230 can build summary information in advance by searching for the media data stored in the storage module 230. The searching operation is performed when the storage module 230 stores new media data, when the storage module 230 deletes the stored media data or at unused time when the AV server 200 does not participate in the AV service or it is performed periodically. Also, types or file formats of media data, which are to be retrieved, may be determined in advance.

The message creating module 240 creates messages needed to communicate with the control device 100. For example, the message creating module 240 creates the message needed in the UPnP discovery and description illustrated in FIG. 2.

Also, the message creating module 240 creates a response message for the request message received from the control device 100 according to an exemplary embodiment of the present invention. Here, the response message includes predetermined summary information. The summary information is needed to calculate the AV task, and may include the number of media files stored in the storage module 220. More particularly, the summary information may include the number of media data by type and file format identified by a message for requesting summary information.

If the search module 220 searches for media data in the storage module 220 as the communication module 210 receives a summary-information-request message illustrated in FIG. 4A, the summary information, which is included in the response message created by the message creating module 240, includes the number of MPEG2-PS video files, MP3 audio files, and JPEG image files.

FIG. 7A illustrates summary information included in a response message created by the message creating module 240. The summary information illustrated in FIG. 7A may be included in a response message to the summary-information-request message illustrated in FIG. 4A. The summary information of FIG. 7A shows that the AV server 200 stores 1000 MPEG2-PS video files, 2000 MP3 audio files, and 3000 JPEG image files through a first line 610, a second line 620, and a third line 630. Summary information that will be included in the summary-information-request message illustrated in FIG. 4B is the same as illustrated in FIG. 7B.

The control module 250 controls modules 210 to 240 that compose the AV server 200.

The term "module", as used herein, refers to, but is not limited to, a software or hardware component, such as a Field Programmable Gate Array (FPGA) or Application Specific Integrated Circuit (ASIC), which executes certain tasks. A module may advantageously be configured to reside in the addressable storage medium, and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Hereinafter, operation of the control device 100 and the AV server 200 will be described in detail.

Figure 8:
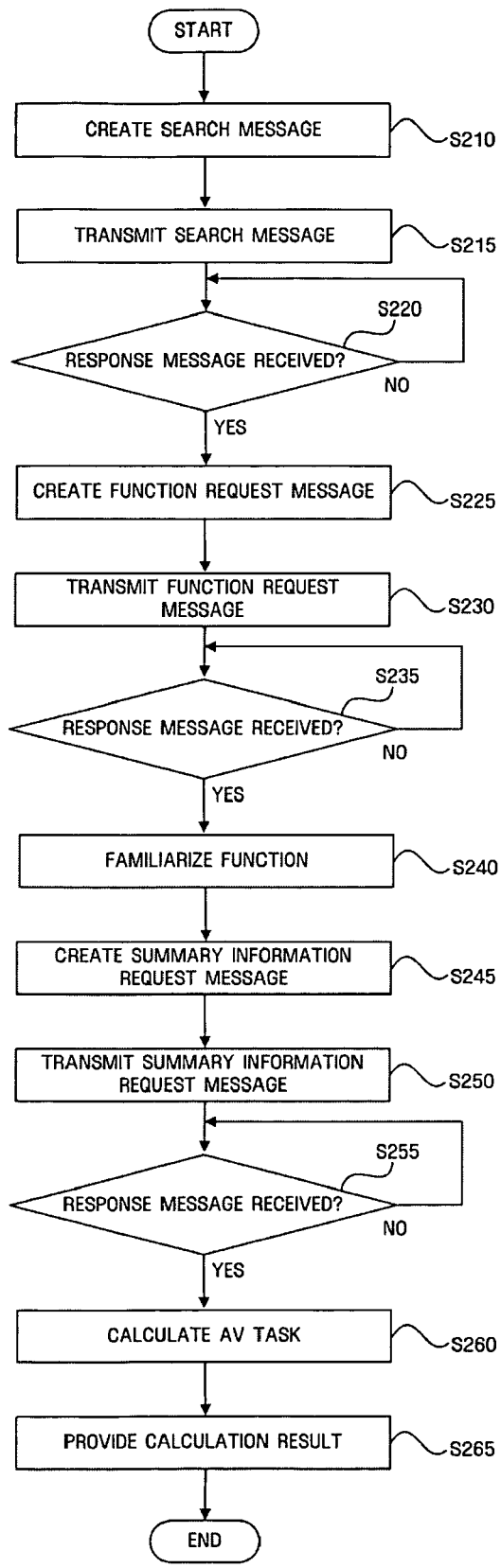
FIG. 8 is a flowchart showing an AV-task-calculation method according to an exemplary embodiment of the present invention.

FIG. 8 is a flowchart showing an AV task calculation method according to an exemplary embodiment of the present invention. The illustrated flowchart corresponds to operation of the control device 100.

The message-creating module 120 creates a search message for retrieving the AV server 200 and the AV player 300 S210. The communication module 110 transmits the search message to devices within the AV system 10 S215. The search message can be broadcasted or multicasted.

When the communication module 110 receives a response message for the search message from the AV server 200 and the AV player 300 S220, the message creating module 120 creates a message for checking a function of the retrieved devices (i.e., the AV server 200 and the AV player 300) in the AV system S225, and the communication module 110 transmits the function request message to the AV server 200 and the AV player 300 S230.

The communication 110 receives a response message for the function request message from the AV server 200 and the AV player 300 S235, the control module 150 can determine a function of the AV server 200 and the AV player 300 S240. That is, the control module 150 determines that the AV server 200 can store media data and the AV player 300 can play specific media data.

S210 to S240 correspond to S110 of FIG. 2, which can be embodied according to the related art.

Then, the message creating module 120 creates a summary-information-request message S245. The communication module 110 transmits the summary-information-request message to the AV server 200 S250.

When the communication module 110 receives a response message for the summary-information-request message from the AV server 200, the AV task calculating module 130 calculates the AV task through the summary information included in the received response message S260. That is, the available AV service may be understood through a combination of the summary information on media data stored in the AV server 200 retrieved in the AV system 10 and the function of the AV player 300 retrieved in the AV system 10.

Then, the AV task calculation result can be provided to a user via the display module 140 S265. The control module 150 may provide the calculation result to other devices via the communication module 110.

Figure 9:
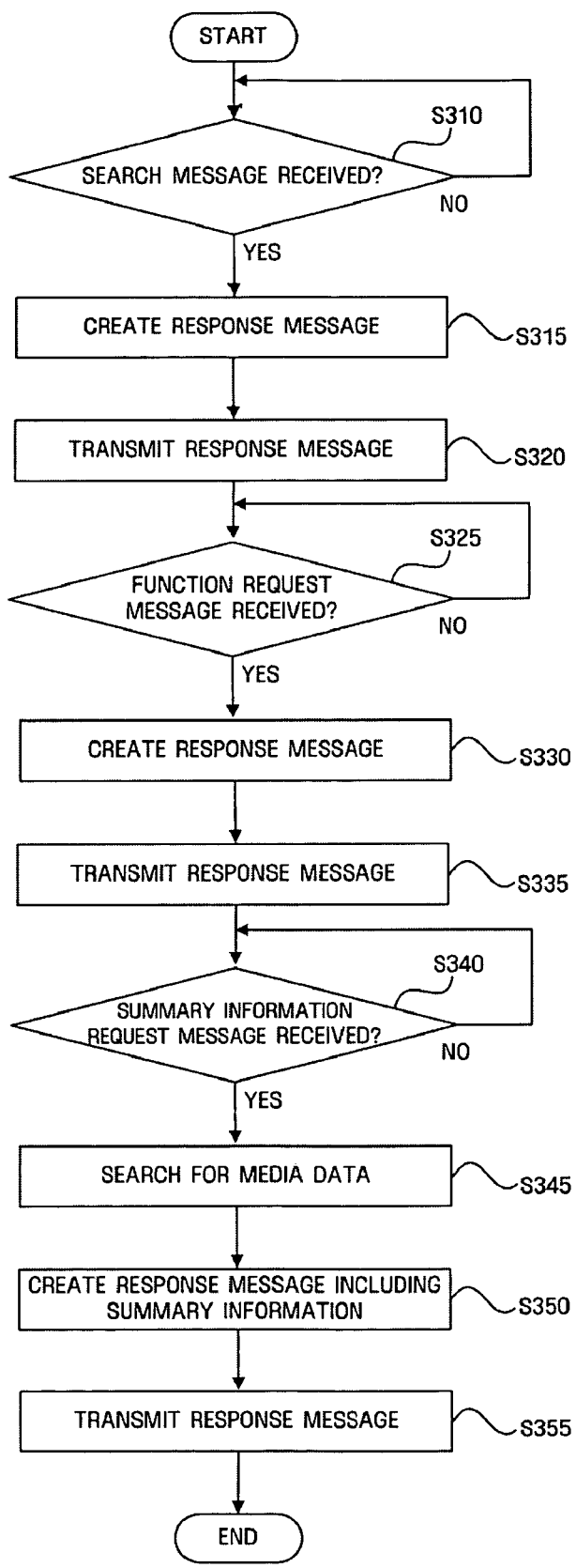
FIG. 9 is a flowchart showing a method of providing summary information for an AV-task calculation according to an exemplary embodiment of the present invention.

FIG. 9 is a flowchart showing a method of providing summary information for an AV task calculation according to an exemplary embodiment of the present invention, which can be performed by the AV server 200.

When the communication module 210 receives a search message from the control device 100 S310, the message creating module 240 creates a response message for the search message S315, and the communication module 210 transmits the response message to the control device 100 S320.

Then, when the communication 210 receives a response message for the function request message from the control device 100 S325, the message creating module 240 creates a response message including function information of the AV server 200 S330. The function information may be on a function for storing media content of the AV server 200.

The communication module 210 transmits the response message including information on the function of the AV server 200 to the control device 100 S335.

S310 to S335 correspond to S110 of FIG. 2, which can be embodied according to the related art.

When the communication module 210 receives a response message for the summary-information-request message from the control device 100 S340, the search module 230 searches the storage module 220 for media data that can be identified through the summary-information-request message S345. The search module can create summary information on the retrieved media data.

The message-creating module 240 creates a response message including summary information on the media data retrieved by the search module 230 S350, and the communication module 210 transmits the message to the control device 100 S355.

If a summary-information-request message is received from the control device 100, the searching operation S345 of the search module 230 is performed; however, the present invention is not limited thereto. As described with reference to FIG. 6, the search module 230 may perform the searching operation prior to receiving the summary-information-request message from the control device 100. In this case, S345 may be performed prior to S340.

According to the present invention, memory usage and time spent for calculating the AV task can be reduced.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of calculating an audio/visual (AV) task, the method comprising:
   requesting summary information on media data from an AV server;
   receiving the summary information from the AV server; and
   calculating, by a control device, an AV task through the received summary information,
   wherein the calculating the AV task comprises determining a type of an AV service to be provided based on a type and file format of media data and a function of an AV player.

2. The method of claim 1, wherein the requesting comprise:
   creating a summary information request message; and
   transmitting the summary information request message to the AV server.

3. The method of claim 2, wherein the transmitting comprises:
   transmitting the summary information request message through a search operation or a browse operation of Universal Plug and Play (UPnP) AV architecture.

4. The method of claim 2, wherein the summary information request message comprises at least one of type and file format of media data that needs the summary information.

5. The method of claim 4, wherein the controlling comprises several types or file formats of media data.

6. The method of claim 1, wherein the received summary information comprises the number of media data files stored in the AV server.

7. The method of claim 6, wherein the received summary information comprises the number of media data files by type or file format.

8. The method according to claim 1, wherein the AV server stores the media data.

9. The method according to claim 1, wherein the AV task shows whether an AV service to be provided exists in a network.

10. A method of providing summary information for calculating an audio/visual (AV) task, comprising:
    receiving a summary information request message from a control device that calculates AV task; and
    transmitting, by an audio/visual server, summary information on predetermined media data as a response to the summary information request message to the control device,
    wherein the AV task is calculated by determining a type of an AV service to be provided based on a type and file format of media data and a function of an AV player.

11. The method of claim 10, further comprising searching for media data by type or file format, wherein the searching is performed prior to the receiving.

12. The method of claim 10, wherein the summary information is on the media data identified through the summary information request message.

13. The method of claim 10, wherein the summary information request message comprises at least one of type and file format of media data that needs the summary information.

14. The method of claim 10, wherein the transmitting comprises:
    searching for the media data identified through the summary information request message;
    creating a response message comprising summary information on the retrieved media data; and
    transmitting the created response message to the control device.

15. The method of claim 10, wherein the summary information comprises a number of media data by type or file format of the media data identified through the summary information request message.

16. A control device comprising:
    a message-creating module that creates a summary information request message and sends the message to an audio/visual (AV) server;
    a communication module that transmits the summary-information-request message to the AV server and receives the summary information from the AV server; and
    an AV task calculating module that calculates an AV task through the received summary information,
    wherein the calculating the AV task comprises determining a type of an AV service to be provided based on a type and file format of media data and a function of an AV player.

17. The apparatus of claim 16, wherein the summary information request message creating module enables the summary information request message to be included in a search operation or a browse operation of Universal Plug and Play (UPnP) AV architecture.

18. The apparatus of claim 16, wherein the summary information request message comprises at least one of type and file format of media data that needs the summary information.

19. The apparatus of claim 18, wherein the summary information request message comprises several types or file formats of media data.

20. The apparatus of claim 16, wherein the received summary information comprises a number of media data files stored in the AV server.

21. The apparatus of claim 20, wherein the received summary information includes the number of media data by type or file format.

22. An AV server comprising:
    a communication module that receives a summary information request message from a control device calculating an audio/visual (AV) task;
    a message-creating module that creates a response message including summary information on predetermined media data as a response to the summary information request message;
    a control module that transmits the response message to the control device via the communication module,
    wherein the calculating the AV task comprises determining a type of an AV service to be provided based on a type and file format of media data and a function of an AV player.

23. The server of claim 22, further comprising:
a search module that searches for media data by type or file format;
wherein the searching is performed prior to receiving the summary information request message.

24. The server of claim 22, wherein the summary information is on the media data identified through the summary information request message.

25. The server of claim 22, further comprising:
a storage module that stores at least one media data file; and
a search module that searches for the media data identified through the summary information request message;
wherein the message-creating module creates a response message including summary information on the media data retrieved by the search module.

26. The server of claim 22, wherein the summary information request message comprises at least one of type and file format of media data that needs the summary information.

27. The server of claim 22, wherein the summary information comprises a number of media data files by type or file format of the media data identified through the summary information request message.

* * * * *